(12) United States Patent
Fehringer et al.

(10) Patent No.: US 9,938,013 B2
(45) Date of Patent: Apr. 10, 2018

(54) HOMOGENOUS FLOODLIGHTING WITH GRANULAR ACTIVATION

(71) Applicant: DIEHL AEROSPACE GMBH, Ueberlingen (DE)

(72) Inventors: Sebastian Fehringer, Nuremberg (DE); Martin Richter, Nuremberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 15/182,962

(22) Filed: Jun. 15, 2016

(65) Prior Publication Data

US 2016/0368607 A1     Dec. 22, 2016

(30) Foreign Application Priority Data

Jun. 19, 2015   (DE) .......................... 10 2015 007 888

(51) Int. Cl.
*B64D 47/02*     (2006.01)
*B64D 11/00*     (2006.01)

(52) U.S. Cl.
CPC ...... *B64D 11/00* (2013.01); *B64D 2011/0038* (2013.01); *B64D 2203/00* (2013.01)

(58) Field of Classification Search
CPC ............ B64D 11/00; B64D 2011/0038; B64D 2203/00
USPC ........................................................ 362/471
See application file for complete search history.

(56) References Cited

U.S. PATENT DOCUMENTS

2016/0018063 A1   1/2016   Skergeth et al.
2016/0238921 A1*  8/2016   Rossini .................. G03B 21/10

FOREIGN PATENT DOCUMENTS

DE           10158395 A1    6/2003
DE       102012207563 A1   11/2013
DE       102013203912 A1    9/2014

* cited by examiner

*Primary Examiner* — Seung Lee
(74) *Attorney, Agent, or Firm* — Scully Scott Murphy and Presser

(57) ABSTRACT

In a wall element for an interior of a vehicle, having a wall area to be illuminated and having an illuminating device which is used to illuminate the wall area, the illuminating device contains a plurality of lighting modules, wherein each of the lighting modules contains a multiplicity of light sources, wherein the lighting module extends straight along a central longitudinal axis and, in the direction of the central longitudinal axis, is placed against identical lighting modules without gaps at the ends, wherein the lighting module in operation has a cone of light which, by using a predefined area that is to be illuminated, extends away from the lighting module and the relative position (R) of which in relation to the lighting module is predefined, is configured in such a way that, on the part of the area that is illuminated by the cone of light, the result is a strip of light extending laterally transversely away from the lighting module, which extends at least over the entire length (L) of the lighting module, along the central longitudinal axis, wherein the wall area is the predefined area to be illuminated.

11 Claims, 4 Drawing Sheets

HOMOGENOUS FLOODLIGHTING WITH GRANULAR ACTIVATION

BACKGROUND OF THE INVENTION

The invention relates to a wall element for an interior of a vehicle.

DISCUSSION OF THE PRIOR ART

In the illumination of areas, there is, amongst other things, the task of floodlighting a given area homogenously. DE 101 58 395 A1 discloses arranging an illumination optical unit between an LED element and an area to be illuminated, in order to illuminate the area uniformly.

SUMMARY OF THE INVENTION

The present invention is directed to improving appropriate illumination in the interior of a vehicle with a wall element. The interior is in particular a passenger cabin. The vehicle is in particular an aircraft. The wall element has a wall area to be illuminated and in particular a screen spaced apart from the wall area. The spacing is of such a nature that, between wall area and screen and/or behind the screen, an illuminating device, which is then indirect, can be placed. The wall element contains an illuminating device which—in the case of the screen is hidden by the latter—and serves to illuminate the wall area. The illuminating device contains a plurality of lighting modules. In particular, at least some of the lighting modules are implemented in the form of at least one lamp.

The wall area is a predefined area to be illuminated. The number of lighting modules is in particular thirty to fifty, in particular forty. In other words, therefore, a curved area is illuminated, in particular indirectly, by the installation of "short" individual lighting modules, which in particular can be activated independently of one another in terms of brightness and colour.

Each of the lighting modules contains a multiplicity of light sources. The multiplicity of light sources is in particular 15 to 60 light sources, in particular 20 or 50 light sources which, in the last case, corresponds to 10 clusters, that is to say groups, each of 5 LEDs WRGBW (white-red-green-blue-white). For instance, then four LED boards with 50 LEDs each are used for ceiling illumination in a vehicle or aircraft. The light-sources are in particular LED light sources (light-emitting diodes), in particular individual LEDs. The lighting module is straight and extends along a central longitudinal axis. At the ends—as based on the lighting module and seen in the direction of the central longitudinal axis—each of the lighting modules (apart from the first and last lighting module with respect to the overall arrangement) is placed without gaps against identical other lighting modules. "Without gaps" here means in particular that lighting modules are placed on one another with the minimum possible spacing necessitated by the construction. In other words, the result is then an arrangement of identical lighting modules immediately adjacent to one another and lined up in a row with the minimum possible spacing.

Each of the lighting modules has a cone of light in operation. The cone of light is formed by the light produced by the lighting module or the light sources and describes the spatial direction or the spatial angle in which the light is emitted. For each of the lighting modules, a respective area which is to be illuminated with the light by the latter is predefined. Here, this can be a real or else an imaginary area. The area extends away from the lighting module. The relative position of the area in relation to the lighting module is predefined.

By using or relative to the given area, the cone of light—or the lighting module for producing the cone of light—is configured in such a way that the result is a strip of light on the part of the area illuminated by the cone of light. The cone of light therefore produces a strip of light during the 'imaginary' impingement on the area. The strip of light extends laterally transversely away from the lighting module. The strip of light extends at least over the entire length of the lighting module along the central longitudinal axis. The strip of light therefore extends on the lighting module, i.e. in the region of the strip of light which is located closest to the lighting module, in the direction along and parallel to the central longitudinal axis, at least over the entire length of the lighting module. The strip of light is strip-shaped. This means that the two side edges of the strip of light which extend away from the lighting module have an opening angle in the range between 0 degrees and only a few degrees towards or away from each other, in particular 15, 10 or 5 degrees, i.e. extend at least approximately parallel. In this sense, "strip shape" is also to be understood as a club, droplet, trapezoidal or similar shape.

In order to have an appropriate strip of light be produced, there is in particular a cone of light which extends in the vicinity of the lighting module in the direction of the central longitudinal axis over the entire length of the lighting module. In a plane containing the central longitudinal axis, it is formed in a strip shape.

The invention is based on the following considerations: a practical illumination problem results, for example, in aircraft. There, there are special regions in which curved areas on the ceiling of the passenger cabin are to be floodlit homogenously in harmony with the remaining cabin illumination.

Only as a result of the availability of LED illumination is it possible to floodlight such curved contours homogenously without shadows. In the integration of curved lamps, such as a "light tube", for example, the use of a lens is technically not feasible. This means that the homogenous floodlighting can be achieved only in the case of relatively small areas. For this reason, in existing domes only the outer region but not the centre is brightly floodlit.

According to the invention, lighting modules are available which substantially produce a strip of light on an appropriate area. By means of lining up or partial superimposition of many such strips of light, homogenous floodlighting of the entire area is then possible. "Homogenous" means in particular constant brightness or illumination intensity. The in particular curved area is illuminated by the in particular short straight lighting modules—in the respective longitudinal direction—being installed lined up in a row with minimum spacing. The length along the central longitudinal axis of a lighting module in this case is, for example, 4 inches (1 inch=2.54 cm).

Thanks to the appropriate lighting modules, any, in particular curved, area can be floodlit homogenously without shadows.

The lighting module contains the multiplicity of individual light sources, in particular individual LEDs, in order to achieve an appropriate light output and a homogenous emission characteristic. Each lighting module is designed to be mechanically rigid and longitudinally straight. Each lighting module has an emission characteristic for light that extends substantially transversely with respect to its longitudinal direction. This means that emission takes place approximately strip-like or droplet-like transversely laterally away from the lighting module.

According to a preferred embodiment, in at least one of the lighting modules the cone of light is configured in such a way that the strip of light has a homogenous brightness distribution along respective lines. The lines in this case extend on the area and, on the latter, equidistantly with respect to the central longitudinal axis. The lines therefore extend at respectively the same vertical distance from the longitudinal axis of the lighting module. In other words, this results in a strip of light which floodlights the area in each case homogenously with respect to the transverse direction thereof.

In a preferred embodiment, in at least one of the lighting modules, the cone of light is configured in such a way that the strip of light has a homogenous brightness distribution along respective lines. The lines extend on the area and, on the latter, transversely with respect to the central longitudinal axis. The homogenous brightness distribution in this case is present at least in a predefinable distance range from the central longitudinal axis. In other words, the result in the longitudinal direction of the strip of light, within the predefinable distance range from the central longitudinal axis, is homogenous floodlighting of the area in the strip of light.

In a preferred embodiment, in at least one of the lighting modules, the cone of light is configured in such a way that the strips of light from two lighting modules supplement each other to form a common strip of light. Here, a common area is predefined for both lighting modules and both strips of light. The two individual strips of light supplement each other without any gap with a homogenous brightness distribution to form the common strip of light with homogenous floodlighting of the area in the region in which they butt up against each other or are superimposed on each other. For this purpose, the lighting modules are placed against one another without gaps at the ends in the direction of their respective central longitudinal axes. An arbitrary, in particular curved, area is thus illuminated in that in each case two but, overall, an arbitrary number, of generally "short" straight lighting modules are installed lined up in a row with one another with minimum spacing. As a result of lining up or superimposing their respective strips of light, they produce a homogenously illuminated area of light made of respectively two strips of light adjoining one another without gaps. In the illumination of an area, the result is thus an overall area of light which appears to be illuminated homogenously but is assembled from strips of light from individual lighting modules. The emission characteristic of the lighting module must therefore be chosen such that, when the emitted light from adjacent lighting modules is superimposed, homogenous area floodlighting of any desired areas located at the side of the modules can be achieved.

In a preferred embodiment, at least one of the lighting modules contains an optical unit, which is connected downstream of the light sources and influences the cone of light produced by the light sources. "Connected downstream" means that the light produced by the light source initially passes through the optical unit in or on the lighting module in order then to form the cone of light emitted by the lighting module. The optical unit contains in particular at least one lens. By means of the use of an optical unit or lens and the correct positioning of the lighting modules, complete homogenous illumination of any desired, in particular curved, area, such as for example the aforementioned dome, can thus be implemented. In particular for "relatively large" curved areas, an optical unit or optical lens is therefore used on the lighting modules in order to be able to illuminate the complete area homogenously. By means of the optical unit or optical lens, floodlighting, for example as far as into the centre of a corresponding dome having a diameter of about two meters, is possible.

In a preferred embodiment, at least one, in particular each, lighting module is adjustable individually on its own with regard to colour and brightness of the light emitted thereby. In this connection, "individually" is to be understood to mean that the module itself is appropriately adjustable, therefore "internally", and, for example, not just "from outside". The latter would be, for example, the application of an externally varied voltage to a lighting module which is intrinsically not variable with respect to its brightness, by means of an "external" dimmer connected upstream of the lighting module. In particular, therefore, in the case of multiple lighting modules, the individual lighting modules can be activated individually and independently of one another in this regard.

Since the "short" lighting modules can be activated independently of one another, (multi-) coloured and dynamic lighting scenarios can be implemented on a common illuminated area. According to this embodiment, illumination is therefore carried out by lighting modules, wherein each module forms a respectively extremely small lighting unit that can be activated with respect to brightness and light colour. During the illumination of an area which is composed of individual strips of light from individual lighting modules, the light in each strip of light can therefore be varied with respect to colour and brightness by activating the associated module.

According to the invention, the result overall is therefore homogenous floodlighting of a curved area with granular activation. A curved area is illuminated through specific integration of "short" lighting modules.

In a preferred embodiment, the lighting modules are at least partly implemented in the form of lamps. Such a lamp contains at least two, in particular four, lighting modules as they have been described above. The lighting modules are placed against one another without gaps along their respective central longitudinal axes. The lamp has a single interface which is suitable for the individual activation of colour and brightness of the respective lighting modules individually and independently of one another. Via the interface, it is therefore possible for each of the lighting modules to be adjusted individually and independently of the others in terms of colour and brightness. Each lamp can in particular be connected via a single connecting plug as interface, in particular to the on-board power supply of an aircraft, and activated completely. In the lamp, the modules are in particular movable with respect to one another, in order to be able to achieve a variable curvature of the overall lamp.

In a preferred embodiment, the lighting modules are arranged along a margin line of the wall area. The respective central longitudinal axes of the lighting modules each extend in the tangential direction of the margin line. The wall area is a dome, in particular curved concavely away from the interior, in particular circular. In this case, the lighting modules surround the wall area to be illuminated in the form of a (circular) ring, wherein their central longitudinal axes are each arranged in the tangential direction of the circumferential line of the wall area. In this embodiment, the wall element is suitable in particular as the aforementioned dome. The diameter of the dome in this case is in particular between 1.50 meters and 2 meters.

In a preferred embodiment, the aforementioned predefinable distance range extends from the edge of the dome as far as the centre thereof. It is thus ensured that the homogenous floodlighting of the dome is carried out in the respective radial direction thereof.

In a preferred embodiment, the central longitudinal axes of adjacent lighting modules are angled with respect to one another at most by an angle which corresponds equally to the Nth part of 360°, the number N being predefined. In particular, all the lighting modules are equally long in the direction of the central longitudinal axis. The number N is in particular between thirty and fifty, in particular forty. In this case, at least N lighting modules are necessary in order to form or to approximate a closed circle. In particular, the number is chosen to be "high enough" and/or the length of the lighting modules is chosen to be "short enough" in order in an intended application to be able to simulate the maximum occurring curvatures "in a sufficiently round manner" by lining up and appropriately angling individual modules with respect to one another.

BRIEF DESCRIPTION OF THE DRAWINGS

Further features, effects and advantages of the invention emerge from the following description of a preferred exemplary embodiment of the invention and from the appended figures, in which.

DETAILED DESCRIPTION OF THE INVENTION

Figure 1:
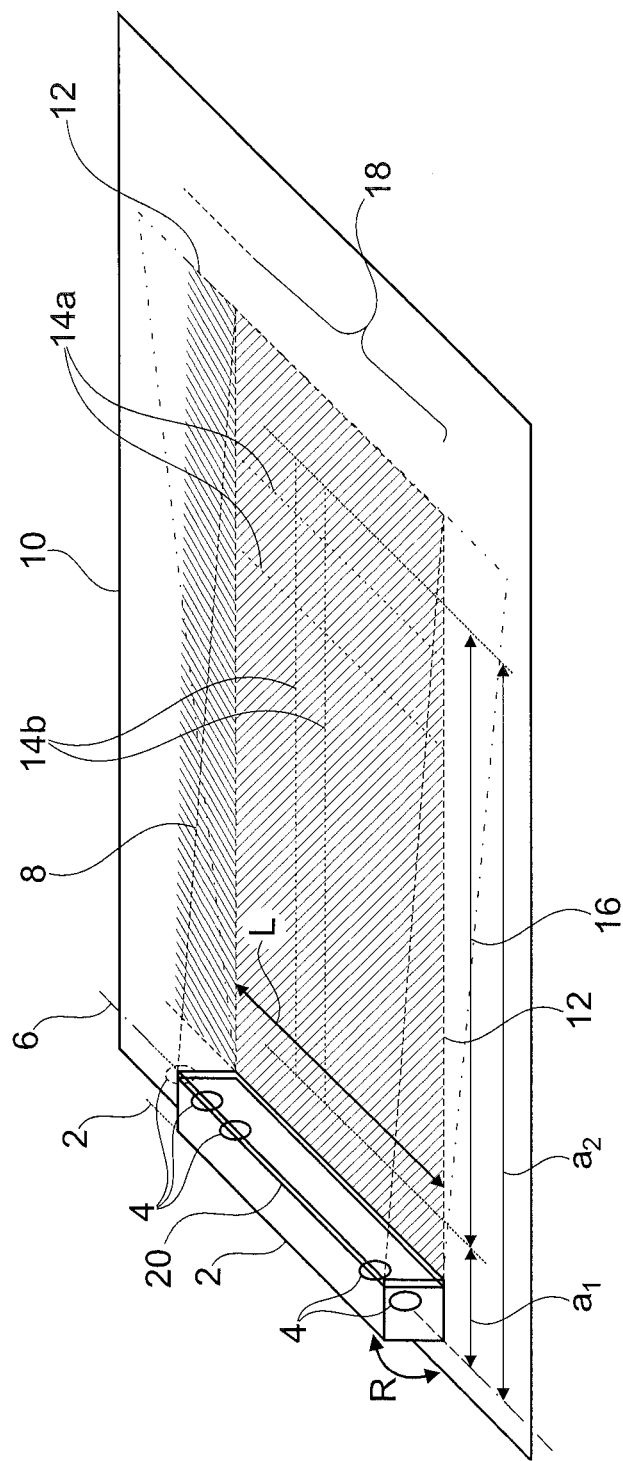
FIG. 1 shows a lighting module with illuminated area.

FIG. 1 shows a lighting module 2 which contains a multiplicity of light sources 4, of which only four are indicated in FIG. 1. The lighting module 2 is straight and extends along a central longitudinal axis 6. The lighting module 2 can be placed against further identical lighting modules 2 in the direction of the central longitudinal axis 6 at its respective ends, that is to say at the ends. In FIG. 1 such a further lighting module 2 with a further light source 4 is indicated dashed.

In operation, that is to say when the light sources 4 are switched on and produce light, the lighting module 2 produces a first cone of light 8 in the form of the emitted light. The cone of light 8 is therefore that spatial area into which the light produced by the lighting module 2 is emitted. In FIG. 1, the cone of light is illustrated as straight and wedge-shaped for reasons of clarity. More realistically from an optical point of view, the cone of light 8 has a trapezoidal shape, which is indicated purely schematically dash-dotted in FIG. 1. This corresponds to the normal behaviour of a cylindrical lens.

In relation to the lighting module 2, an area 10 is defined or predefined in such a way that firstly its shape and secondly its relative position R in relation to the lighting module 2 is predefined. The area 10 extends away from the lighting module 2. The cone of light 8 is configured in such a way that, on the part of the area 10 that is illuminated by the cone of light 8, a strip of light 12 extending laterally transversely away from the lighting module 2 is formed, being illustrated hatched in FIG. 1. The strip of light 12 extends at least in the region of the lighting module, i.e. in the immediate vicinity of the latter, along and parallel to the central longitudinal axis 6 over the entire length L of the lighting module 2.

In a first embodiment, the strip of light 12 has a homogenous brightness distribution along respective lines 14a. The lines 14a here extend on the area 10 equidistantly with respect to the central longitudinal axis 6. By way of example, only two such lines 14a are drawn in FIG. 1.

In a further embodiment, the strip of light 12 also has a corresponding homogenous brightness distribution with respect to lines 14b, which extend on the area 10 transversely with respect to the central longitudinal axis 6. The homogenous brightness distribution here is restricted to a distance range 16 between two distances a1 and a2 from the central longitudinal axis 6. Here, too, once more by way of example, only two of the lines 14b are drawn in FIG. 1.

In a further embodiment, the two lighting modules 2 illustrated are placed against each other at the ends without gaps in the direction of the central longitudinal axes 6. For the two lighting modules 2, an area 10 is jointly predefined. FIG. 1 also shows indicated the strips of light 12 of the further lighting module 2 indicated dashed. The cone of light 8 from each lighting module 2 is configured in such a way that the strips of light 12 from the two lighting modules 2 supplement each other on the area 10 without gaps with a homogenous brightness distribution to form a common strip of light 18.

FIG. 1 also shows a further embodiment having an optical unit 20, which is connected downstream of the light sources 4 and which influences the respective cone of light 8 from the lighting module 2. In the example, the optical unit 20 is a lens.

Also optionally, each of the lighting modules 2 can be adjusted individually, i.e. independently of other lighting modules 2, with regard to the colour and brightness of the light emitted thereby.

Figure 2:
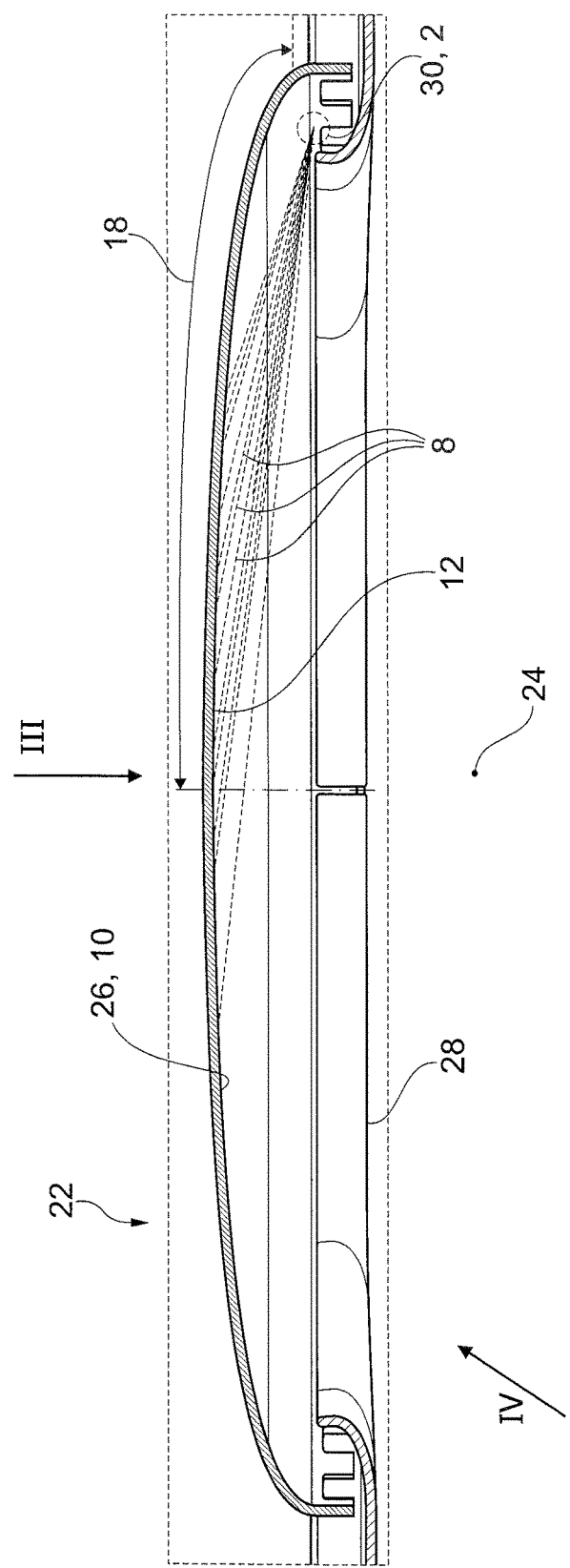
FIG. 2 shows a wall element with dome and screen in section.

FIG. 2 shows a detail from a wall element 22 for an interior 24, in the present case a passenger cabin of a vehicle not further illustrated, in the present case an aircraft. The wall element 22 has a wall area 26 and an illuminating device 30, indicated only symbolically here, for illuminating the wall area 26. In an alternative embodiment, it additionally has a screen 28 spaced apart from the wall area 26, so that the result is an indirect illuminating device 30, which is hidden by the screen 28 in such a way that it is not visible from the interior 24. The illuminating device 30 is then used for the indirect illumination of the wall area 26.

The illuminating device 30 comprises a plurality, forty in the example, of the lighting modules 2 described above. The wall area 26 corresponds to the predefined area 10 to be illuminated. FIG. 2 shows the cone of light 8 in the form of indicated beams of light from an individual lighting module 2. The cone of light 8 and the lighting module 2 are implemented as described above in such a way that, for each of the lighting modules 2, a strip of light 12 is formed on the wall area 26. The wall area 26 in the example is a dome curved concavely away from the interior 24 and having a circular circumferential line. The screen 28 surrounds the dome in the manner of a circular ring, and the lighting modules 2 are likewise arranged in the manner of a circular ring, surrounding the dome. The central longitudinal axes 6 of all the lighting modules 2 are each arranged in the tangential direction of the circumferential line of the dome. In this embodiment the distance range 16 explained above extends in the respective radial direction from the edge as far as the centre of the dome.

Figure 3:
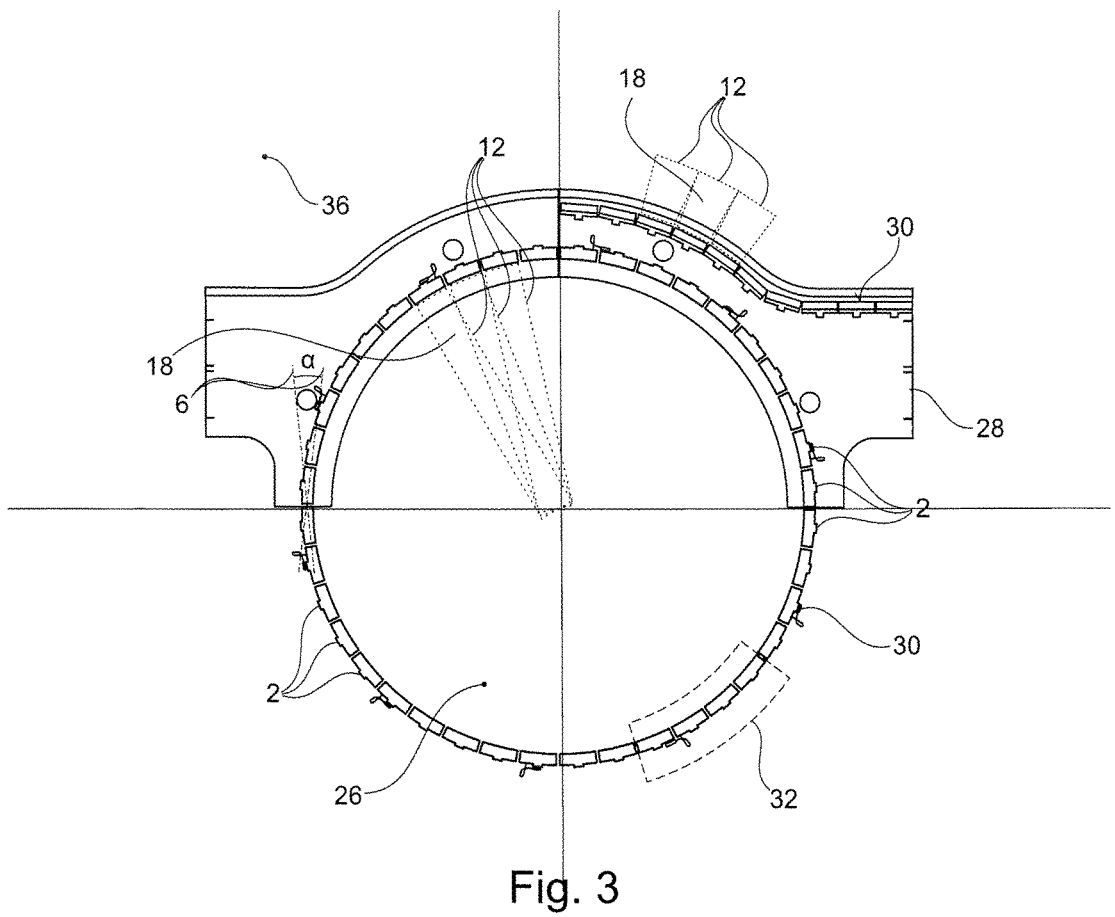
FIG. 3 shows the wall element from FIG. 2 in the direction of the arrow III in plan view without dome.

FIG. 3 shows the wall element 22 in the direction of the arrow III from FIG. 2, that is to say in the direction of view towards the interior 24, wherein, for reasons of clarity, the wall area 26, that is to say the dome, and part of the screen 28 have been left out. It is therefore possible to see in FIG. 3 only part of the screen 28 and the illuminating device 30 and the construction of the latter from the lighting modules 2. In each case here four lighting modules 2 are combined to form a lamp 32. Each of the lamps 32 has only a single interface 34. The latter is used for the individual—that is to say mutually independent—activation of colour and brightness of each of the four lighting modules 2 contained.

Along the respective central longitudinal axes 6, the lighting modules 2 are placed against one another at the ends, that is to say with their respective ends, without any gaps, i.e. with the minimum possible spacing. The lamps 32 are also configured in such a way that two lamps 32 can in turn be placed against each other without gaps with respect to the lighting modules 2 contained therein. For the wall element 22, a number N is predefined, N=40 in the example. In the example, this number corresponds to the number of lighting modules 2 surrounding the dome. The central longitudinal axes 6 of all the respectively adjacent lighting modules 2, also within the lamps 32, are angled with respect to one another only by an angle α=360°/N of the Nth part of 360 degrees. This is illustrated in FIG. 3 by way of example for two adjacent lighting modules 2. Since all the lighting modules 2 are implemented with the same length L, the result of the forty lighting modules 2 lined up in a row without gaps is a complete circle.

FIG. 3 shows, alternatively, that in the wall element 22 there is a further illuminating device 30, which does not extend circularly but longitudinally in the manner of a curve on the outer side or the outer edge of the screen 28. This device is likewise constructed appropriately from lighting modules 2 and is used to illuminate a further wall area 36 surrounding the wall area 26 and the screen 28, in order to produce corresponding strips of light 12 and a common strip of light 18 there as well. The position of the wall areas 26 and 36 not illustrated is indicated in FIG. 3 by the corresponding reference symbols.

In FIG. 3, by way of example, some of the strips of light 18 produced by the respective lighting modules 2, which are also superimposed homogenously here without gaps to form overall strips of light 18, are drawn in. In the dome, the common strip of light 18 forms a circle of light.

Figure 4:
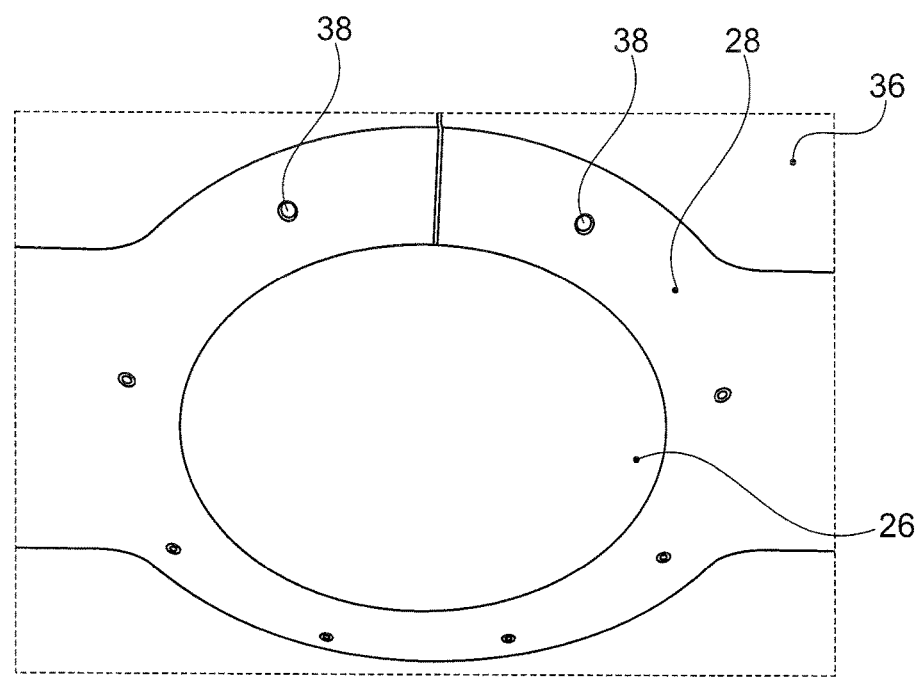
FIG. 4 shows the wall element from FIG. 2 in the direction of the arrow IV in a perspective view.

FIG. 4 shows, in a perspective illustration in the direction of the arrow IV from FIG. 2, a view of the wall element 22 and of the screen 28 and of the wall areas 26 and 36. The latter are illuminated indirectly and homogenously by the illuminating devices 30 which are in operation, i.e. producing light, shown in FIG. 3. FIG. 4 also shows further additional conventional lamps 38, not explained in more detail, which are arranged in the screen 28.

LIST OF REFERENCE SYMBOLS

2 Lighting module
4 Light source
6 Central longitudinal axis
8 Cone of light
10 Area
12 Strip of light
14a,b Line
16 Distance range
18 Common strip of light
20 Optical unit
22 Wall element
24 Interior
26 Wall area
28 Screen
30 Illuminating device
32 Lamp
34 Interface
36 Wall area
38 Lamp
R Relative position
L Length
a1,2 Distance
α Angle

What is claimed is:

1. A wall element for an interior of a vehicle, comprising:
a wall area to be illuminated and an illuminating device for illuminating the wall area,
wherein the illuminating device comprises a plurality of lighting modules, wherein each of the lighting modules comprises a plurality of light sources,
wherein at least one of the lighting modules extends straight along a central longitudinal axis thereof and, in the direction of the central longitudinal axis, is placed against identical lighting modules without gaps at the ends of the at least one lighting module,
wherein the wall area extends away from the at least one lighting module,
wherein the at least one lighting module in operation generates a cone of light which is configured in such a way that, on the wall area that is illuminated by the cone of light, the result is a strip of light, and
wherein the strip of light extends laterally transversely away from the lighting module and extends at least over the entire length of the at least one lighting module along the central longitudinal axis.

2. The wall element according to claim 1, wherein in at least one of the lighting modules, the cone of light is configured in such a, way that the strip of light has a homogenous brightness distribution along respective lines extending on the wall area equidistantly with respect to the central longitudinal axis.

3. The wall element according to claim 1, wherein in at least one of the lighting modules, the cone of light is configured in such a way that the strip of light has a homogenous brightness distribution along respective lines extending on the wall area transversely with respect to the central longitudinal axis, at least in a, predefinable distance range from the central longitudinal axis.

4. The wall element according to claim 1, wherein, in at least one of the lighting modules, the cone of light is configured in such a way that the strips of light from two lighting modules which are placed against each other without gaps at the ends in the direction of respective central longitudinal axes of the lighting modules supplement each other without any gap with a homogenous brightness distribution to form a common strip of light on the wall area.

5. The wall element according to claim 1, wherein in at least one of the lighting modules, an optical unit is connected downstream of the light sources to influence the cone of light of the at least one of the lighting modules.

6. The wall element according to claim 1, wherein in at least one of the lighting modules, the lighting module is adjustable individually with regard to the colour and brightness of the light emitted thereby.

7. The wall element according to claim 1, wherein the lighting modules are at least partly implemented in the form of a lamp which comprise at least two lighting modules, which are placed against one another without gaps along respective central longitudinal axes of the at least two lighting modules, wherein the lamp has a single interface for the individual activation of colour and brightness of the at least two lighting modules.

8. The wall element according to claim 1, wherein the lighting modules are arranged along a margin line of the wall area, wherein central longitudinal axes of the lighting modules each extend in the tangential direction of the margin line, wherein the wall area is a dome.

9. The wall element according to claim 8, wherein the cone of light of said lighting modules are configured in such a way that the strip of light has a homogenous brightness distribution along respective lines extending on the wall area transversely with respect to the central longitudinal axis, at least extending on the wall area transversely with respect to the central longitudinal axis, at least in a predefinable distance range which extends from the edge of the dome as far as to the centre thereof.

10. The wall element according to claim 9, wherein adjacent lighting modules are angled with respect to one another at most by an angle equal to the Nth part of 360° with respect to central longitudinal axes of the adjacent lighting modules, wherein the number N is predefined.

11. The wall element according to claim 8, wherein adjacent lighting modules are angled with respect to one another at most by an angle equal to the Nth part of 360° with respect to central longitudinal axes of the adjacent lighting modules, wherein the number N is predefined.

* * * * *